(12) United States Patent
Shinichiro et al.

(10) Patent No.: US 7,453,221 B1
(45) Date of Patent: Nov. 18, 2008

(54) SYSTEM FOR CONTROLLING ROTATION OF A DISK DRIVE

(75) Inventors: Kuno Shinichiro, Hiratsuka (JP);
Ravishanker Krishnamoorthy, Chiltern Park (SG); Foo Leng Leong, Singapore (SG); Cheng Yong Teoh, Singapore (SG)

(73) Assignee: Marvell International, Ltd. (BM)

( * ) Notice: Subject to any disclaimer, the term of this patent is extended or adjusted under 35 U.S.C. 154(b) by 54 days.

(21) Appl. No.: 11/546,600

(22) Filed: Oct. 11, 2006

Related U.S. Application Data

(60) Provisional application No. 60/777,460, filed on Feb. 27, 2006.

(51) Int. Cl.
*H02P 6/20* (2006.01)
*H02P 6/24* (2006.01)

(52) U.S. Cl. .................. 318/430; 318/375; 318/456; 360/74.1

(58) Field of Classification Search .................. 318/138, 318/254, 375–380, 430, 431, 439, 459, 500, 318/720–724, 400.01, 400.32, 456, 700; 388/928.1; 360/73.01, 74.1
See application file for complete search history.

(56) References Cited

U.S. PATENT DOCUMENTS

| | | | | |
|---|---|---|---|---|
| 4,629,949 A | * | 12/1986 | Senso | .......................... 318/257 |
| 4,779,260 A | * | 10/1988 | Kaneko et al. | .............. 369/266 |
| 5,701,284 A | * | 12/1997 | Lee | .......................... 369/47.44 |
| 6,664,749 B2 | * | 12/2003 | Heydt et al. | .................. 318/254 |
| 7,158,329 B1 | * | 1/2007 | Ryan | ..................... 318/400.09 |

OTHER PUBLICATIONS

Jeppesen, James et al., "Hard Disk Controller: the Disk Drive's Brain and Body," Proceedings of the International Conference on Computer Design: VLSI in Computers & Processors (ICCD'01), 6 pages, IEEE 2001.

Pelz, Georg, "Designing Circuits for Disk Drives," Proceedings of the International Conference on Computer Design: VLSI in Computers & Processors (ICCD'01), 6 pages, IEEE 2001.

Sereinig, W., "Motion-Control: the Power Side of Disk Drives," Proceedings of the International Conference on Computer Design: VLSI in Computers & Processors (ICCD'01), 6 pages, IEEE 2001.

* cited by examiner

*Primary Examiner*—Bentsu Ro
(74) *Attorney, Agent, or Firm*—Brinks Hofer Gilson & Lione

(57) ABSTRACT

A disk drive system is set forth that comprises a rotatable storage medium adapted to store data, a spindle motor disposed to rotate the rotatable storage medium, and a spindle motor control system. The spindle motor control system brakes rotation of the spindle motor in response to inductive sensing of the rotation of the spindle motor.

11 Claims, 3 Drawing Sheets

SYSTEM FOR CONTROLLING ROTATION OF A DISK DRIVE

CROSS-REFERENCE TO RELATED APPLICATION

This application claims the benefit of U.S. Provisional Application No. 60/777,460, filed Feb. 27, 2006, which is hereby incorporated by reference.

BACKGROUND

Disk drive technology has undergone rapid and substantial improvements over time. These improvements have led to increasing use of high density hard disk drives and the like in a wide range of devices. Such devices include, for example, MP3 players, cellular phones, personal organizers, cable boxes, video recorders, and automotive systems, as well as more conventional devices associated with disk drives, such as computers, microcontrollers, embedded controllers, and the like.

Consumer expectations as well as industrial requirements have placed a substantial burden on disk drive designers to increase the performance of such drives. One manner in which performance of the drive may be increased is by reducing the time required for the drive to spin-down from its operating rotation rate. Another manner in which performance of the drive may be increased is by reducing the time required for the drive to spin-up to its operating rotation rate after the disk drive has received a spin-down command.

Conventional disk drive systems include a storage medium that is rotatably driven by a spindle motor. Such disk drive systems often use back EMF detection to determine the position of the spindle motor during spin-up and spin-down operations. Since sensing of the spindle motor position using back EMF detection is difficult, if not impossible, when the disk is rotating slowly, most spin-down operations are implemented by simply waiting for a certain calculated time to elapse thereby allowing sufficient time for the disk to stop rotating before a spin-up operation is executed. The calculated time may be based on a number of factors including the torque constant Kt of the spindle motor. Once this waiting time has been calculated, it is used for all spin-up and spin-down operations and becomes a fixed constant used by the disk drive system.

Improvements in spin-up and spin-down disk drive operations may be achieved if the latency introduced by the fixed waiting time is reduced or eliminated. Reduction or elimination of the fixed waiting time may be achieved through real-time spindle motor rotation sensing. Implementing such real-time sensing in an economical manner, however, can be a significant challenge.

SUMMARY

The present invention is defined by the following claims, and nothing in this section should be taken as a limitation on those claims.

By way of introduction, the preferred embodiments described below provide a disk drive system comprising a rotatable storage medium adapted to store data, a spindle motor disposed to rotate the rotatable storage medium, and a spindle motor control system. The spindle motor control system brakes rotation of the spindle motor in response to inductive sensing of the rotation of the spindle motor. In one preferred embodiment, the inductive sensing is conducted using all of the electrical drive states associated with the spindle motor. In another preferred embodiment, successive inductive sensing cycles are compared to one another to determine whether the spindle motor is rotating. Other preferred embodiments are provided, and each of the preferred embodiments described herein can be used alone or in combination with one another.

The preferred embodiments will now be described with reference to the attached drawings.

DETAILED DESCRIPTION OF THE PRESENTLY PREFERRED EMBODIMENTS

Figure 1:
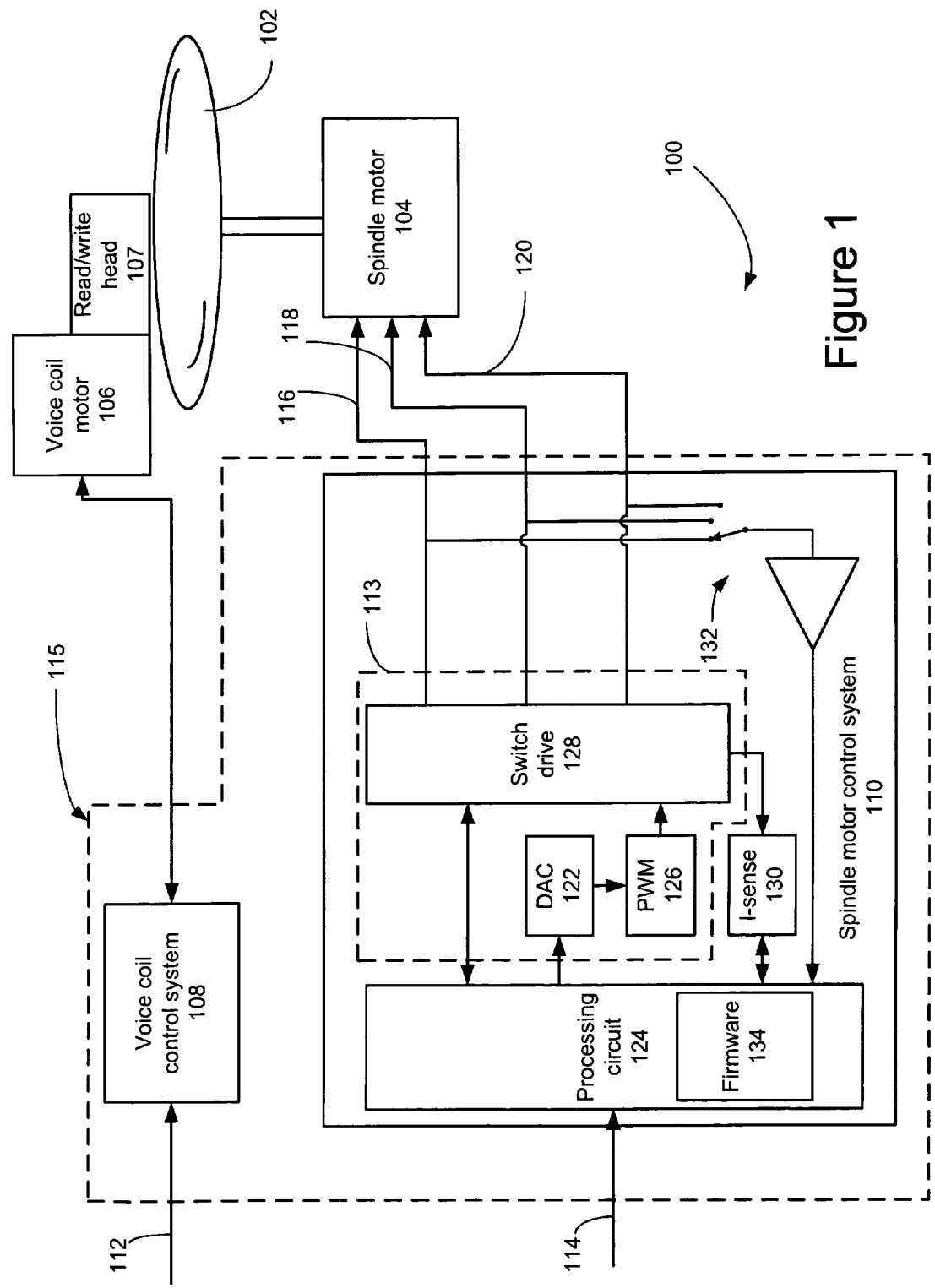
FIG. 1 is a schematic block diagram of a disk drive system having circuitry and programming for controlling rotation of the disk drive medium.

FIG. 1 is a schematic block diagram of a disk drive system 100. Disk drive system 100 includes a rotatable storage medium 102 that is disposed for rotation by a spindle motor 104. A voice coil motor 106 is disposed to control the motion of a read/write head 107 that is suspended close to the storage medium 102. The read/write head 107 can be moved radially by the voice coil motor 106 to read data from and write data to different tracks formed on the medium 102. Movement of the read/write head 107 by the voice coil motor 106 is directed, in turn, by a voice coil control system 108, which also controls the manner in which the read/write head 107 reads and writes information to and from the storage medium 102. Voice coil control system 108 may be responsive to commands 112, such as read, write, park, etc., received from a CPU-based system, embedded controller, microcontroller, or the like.

Rotation of the storage medium 102 is dependent on the rotation of the spindle motor 104. Spindle motor 104, in turn, has its operation directed by a spindle motor control system 110. The spindle motor control system 110 may be responsive to commands 114 received from a CPU-based system, embedded controller, microcontroller, or the like. The voice coil control system 108 and spindle motor control system 110 may be implemented in a monolithic format as a single hard disk drive controller module 115. However, systems 108 and 110 alternatively may be implemented as discrete modules and/or with discrete system components.

In system 100, the spindle motor control system 110 operates to brake rotation of the spindle motor 104 in response to inductive sensing of the spindle motor rotation. Although this functionality may be accomplished in a number of different manners, the exemplary spindle motor control system 110 shown in FIG. 1 includes a motor drive system 113 that is configured to provide pulse width modulated power signals 116, 118, and 120, to drive the spindle motor 104. Spindle motor 104 may be in the form of a three-phase Y-connected stator winding with a six pole pair permanent magnet. In such a configuration, the minimum possible step angle is $360°/(6 \times 6) = 10°$, which corresponds to the minimum movement that the spindle motor 104 may make by applying voltages to its three phases. This configuration also employs six voltage combinations, or states, $S_n$, to drive spindle motor 104. As such, six electrical states corresponding to one electrical period are used to drive the spindle motor 104 through a mechanical rotation of 60°. Depending on the configuration of the spindle motor 104, a larger number or fewer number of total states, $S_{total}$, also may be employed.

The exemplary implementation of the spindle motor control system 110 shown in FIG. 1 includes a digital-to-analog converter 122 that receives data from a processing circuit 124 to provide one or both of a carrier signal and/or modulator signal to a pulse width modulator 126. Switched PWM signals are provided from the pulse width modulator 126 to the input of a switch drive circuit 128. The switch drive circuit 128, in turn, provides switched PWM power signals 116, 118, and 120, to spindle motor 104. A current sense circuit 130 is disposed to monitor drive current provided to the spindle motor 104 by the motor drive system 113. To this end, sense circuit 130 may be connected to selectively detect the current provided by the switch drive 128 as power is provided to the spindle motor 104 at 116, 118, and 120, during the various electrical states $S_n$. Current thus may be measured independently during each electrical state $S_n$. Sense circuit 130 provides one or more signals indicative of the value of the drive current to processing circuit 124. The signals provided by sense circuit 130 may be analog, digital, etc., depending on the particular system design.

At high rates of rotation, the position of the spindle motor 104 may be determined by sensing the back EMF signals from the spindle motor 104. In the illustrated embodiment, a back EMF sensing circuit 132 is provided to selectively sense the back EMF signals at 116, 118, and 120. The back EMF sensing circuit 132 may provide one or more signals to processing circuit 124 that are indicative of the value of the selected back EMF signal. The signals provided by sensing circuit 132 may be analog, digital, etc., depending on the particular system design. Processing circuit 124 may use the back EMF signals to ensure that spindle motor 104 is driven in the proper manner under various operational conditions.

Processing circuit 124 controls operation of the motor drive system 113 and, if desired, other components of the spindle motor control system 110 in a predetermined manner. To this end, the processing circuit 124 may include firmware 134 that is executable by the processing circuit 124 to direct operation of the motor drive system 113 in the predetermined manner.

Figure 2:
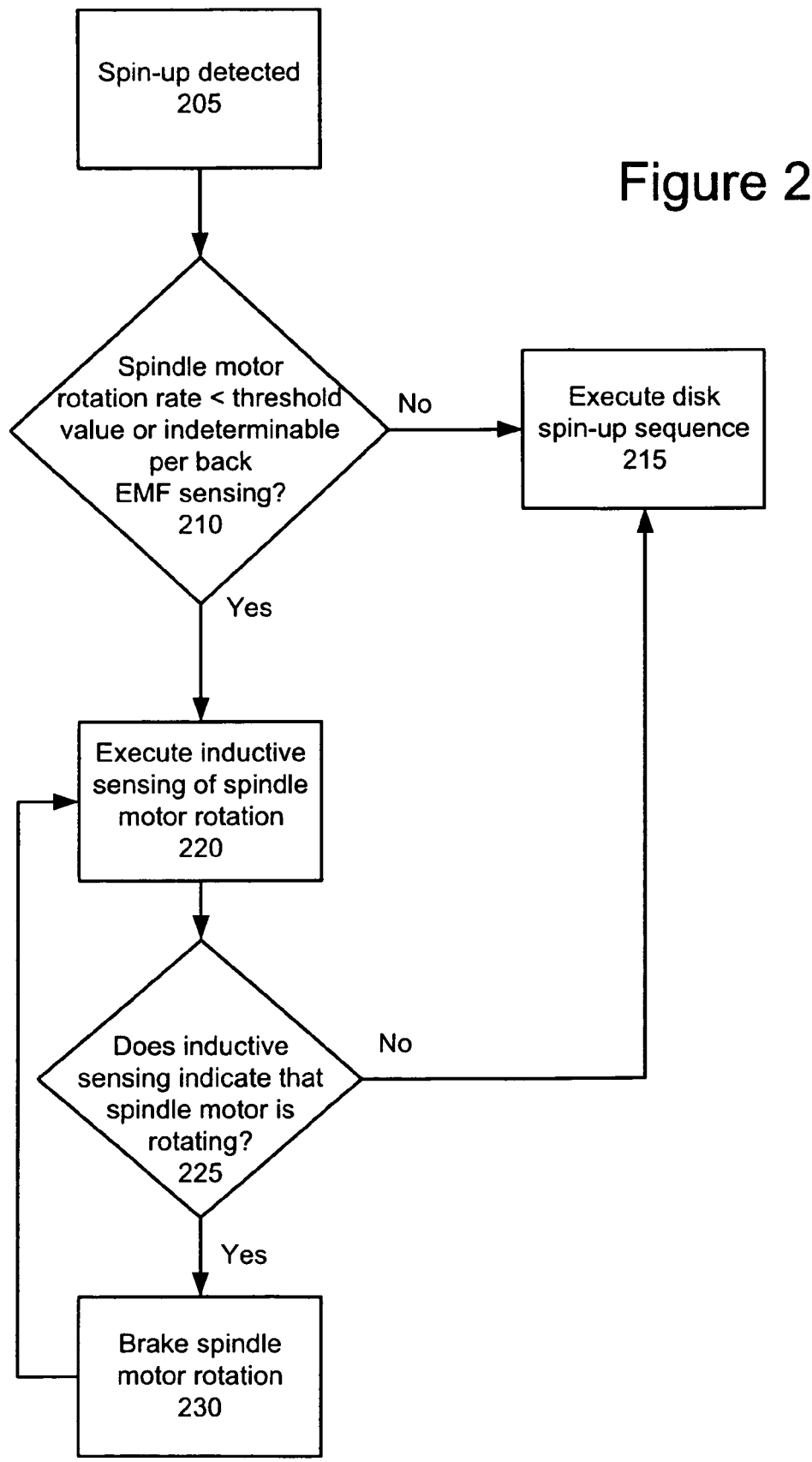
FIG. 2 is a flowchart showing a plurality of interrelated operations that may be implemented by the system of FIG. 1 in response to a disk spin-up command.

Firmware 134 may be executed by the processing circuit 124 to implement a number of different functions that are executed by the spindle motor control system to properly drive the spindle motor 104. FIG. 2 is a flowchart showing a plurality of interrelated operations that may be implemented in firmware 134 in response to a spin-up command at communication link 114. As shown, the spin-up command is detected at block 205. The spin-up command may be received, for example, in close temporal proximity to a spin-down command. Therefore, any spin-up operations executed by the spindle motor control system 110 should be implemented based on the contemporaneous rotation rate of the spindle motor 104. As such, the rate of rotation of the spindle motor 104 is compared against a threshold value using back EMF sensing at block 210. If the rate of rotation is greater than a threshold value, a standard disk spin-up operation is executed at block 215 to drive the spindle motor 104 from the sensed rotation rate to an operational rotation rate. However, if the rate of rotation is less than the threshold value or cannot be determined using back EMF sensing, it is assumed that the spindle motor 104 is either stopped or spinning slowly at a rate below which EMF sensing is inaccurate. Accordingly, an inductive sensing operation is executed at block 220 to determine whether the spindle motor 104 is rotating. The results of the inductive sensing operation are checked at block 225. If the results of the inductive sensing operation indicate that the spindle motor 104 is rotating, the spindle motor control system 110 executes an operation at block 230 to brake rotation of the spindle motor 104. If desired, the spindle motor control system 110 may execute multiple inductive sensing and braking operations at blocks 220, 225, and 230, in a repetitive manner until the inductive sensing operation indicates that the spindle motor rotation has ceased or is below a threshold value at block 225. In FIG. 2, the spindle motor control system 110 executes the inductive sensing operation and braking operation in an alternating manner. Once the spindle motor rotation has ceased or is below a threshold value as determined at block 225, the spindle motor control system 110 executes the disk spin-up sequence shown at block 215.

The inductive sensing operation executed at block 220 may be implemented in a number of different manners. One manner of inductively sensing whether the spindle motor 104 is rotating involves directing the switch drive 128 to apply a switching voltage at one or more electrical states $S_n$. Using the current sense circuit 130, the processing circuit 124 monitors the rate at which the current increases. A switching voltage is again applied at the one or more electrical states $S_n$ and the resulting rate of current increase(s) are compared with the prior results. If the difference(s) exceeds a threshold value, the spindle motor 104 is rotating. If the difference(s) falls below a threshold value, the spindle motor 104 has ceased rotating. In each instance, application of the switching voltage should be sufficiently fast so as not to increase the rotation rate of the spindle motor 104.

Figure 3:
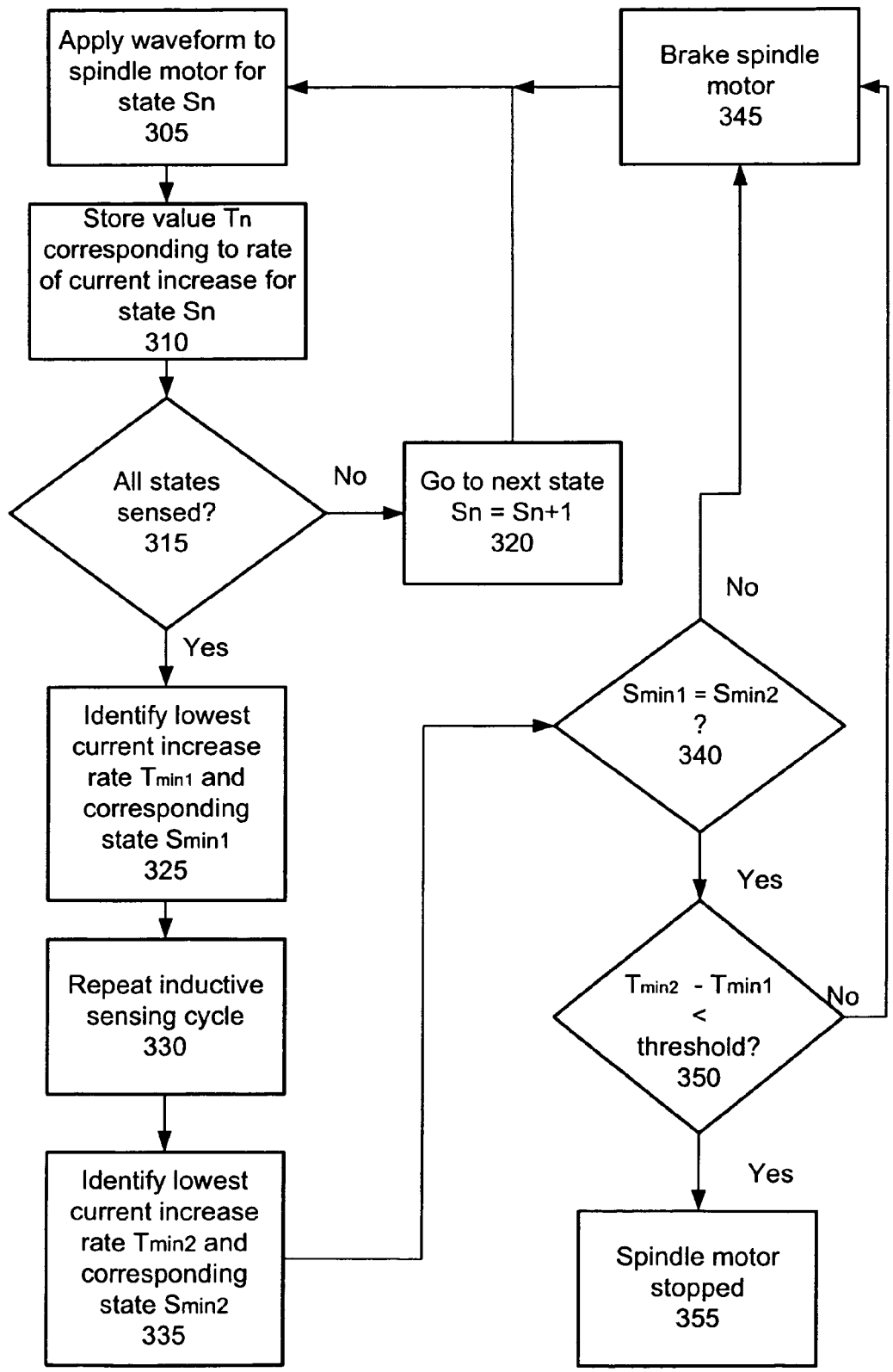
FIG. 3 is a flowchart showing a plurality of interrelated operations that may be implemented by the spindle motor control system of FIG. 1 for inductive sensing and braking of the spindle motor.

FIG. 3 is a flowchart illustrating a plurality of interrelated operations that may be implemented by the spindle motor control system 110 for inductive sensing and braking of the spindle motor 104. In this implementation, all of the electrical states $S_1$ through $S_{total}$ are used in the inductive sensing operation. At block 305, inductive sensing is initiated by applying a waveform to the spindle motor 104 for the first electrical state $S_1$. A value $T_1$ corresponding to the rate of current increase for the waveform applied for state $S_1$ is stored at block 310. The rate of current increase corresponds to the rotational position of the spindle motor 104 as well as the inductance of the spindle motor windings associated with the electrical state, $S_1$. As such, the value of $T_1$ also has a correspondence with rotational position and inductance values associated with the spindle motor 104.

At block 315, a check is made to determine whether all electrical states have been sensed. For example, the value of $S_n$ may be compared with $S_{total}$ to determine whether they are equal. If less than all of the electrical states have been sensed, the next electrical state $S_{n+1}$ is selected at block 320 and the inductive sensing operations 305 and 310 are repeated for electrical state $S_{n+1}$. The inductive sensing operations continue until all states have been sensed as determined at block 315 thereby completing an inductive sensing cycle. At block 325, the lowest current increase rate $T_{min1}$ and the corresponding state $S_{min1}$ are identified and stored for further use. At block 330, the inductive sensing cycle represented by blocks 305, 310, 315, and 320 is repeated. The lowest current increase rate $T_{min2}$ and the corresponding state $S_{min2}$ for this repeated cycle are identified and stored at block 335.

The values acquired in the operations executed at blocks 305 through 335 are used to determine whether the spindle motor 104 is rotating. In the example shown in FIG. 3, the values for Smin1 and Smin2 are compared at block 340 to determine whether the minimum current rate increases occurred during the same electrical states. If not, the spindle motor 104 is still rotating and the spindle motor control system 110 executes a braking operation at block 345 and again performs the inductive sensing operations shown at blocks 305 through 335. If the minimum current rate increases occurred during the same electrical states, a secondary motion check may be made at block 350. In this example, the secondary motion check involves a comparison of the difference between the values $T_{min1}$ and $T_{min2}$ with a threshold value. If the difference is below the threshold value, it is assumed that the spindle motor 104 has ceased rotation at block 355. However, if the difference value exceeds the threshold value, the spindle motor control system 110 may execute a braking operation at block 345 before conducting further inductive sensing operations.

It is intended that the foregoing detailed description be understood as an illustration of selected forms that the invention can take and not as a definition of the invention. It is only the following claims, including all equivalents, that are intended to define the scope of this invention.

What is claimed is:

1. A disk drive system comprising:
a rotatable storage medium adapted to store data;
a spindle motor disposed to rotate the rotatable storage medium;
a control system operating to inductively sense spindown of the spindle motor by
executing an inductive sensing cycle through all states, $S_1$ through $S_{total}$, of the spindle motor to determine a minimum current rise time value, $T_{min1}$, occurring at a spindle motor state, $S_{min1}$, and
executing a further inductive sensing cycle through all states, $S_1$ through $S_{total}$, of the spindle motor to determine a further minimum current rise time value, $T_{min2}$, occurring at a spindle motor state $S_{min2}$,
where the control system executes a braking operation of the spindle motor and re-executes the inductive sensing cycle and further inductive sensing cycle if $S_{min1}$ is different from $S_{min2}$.

2. The system of claim 1, where the rotatable storage medium comprises a hard disk.

3. The system of claim 1, where the spindle motor control system compares a difference value to a threshold value to determine whether the spindle motor has substantially ceased rotating before executing the braking operation, where the difference value corresponds to $T_{2min}-T_{1min}$.

4. The system of claim 1, where the spindle motor control system comprises:
a motor drive system disposed to provide PWM drive power to the spindle motor;
a current sense circuit disposed to monitor drive current provided to the spindle motor by the motor drive system;
a processing circuit disposed to control operation of the motor drive system and to receive one or more signals from the current sense circuit indicative of a value of the drive current;
firmware executable by the processing circuit to direct the motor drive system to brake rotation of the spindle motor in response to inductive sensing of the rotation of the spindle motor.

5. A disk drive system comprising:
rotatable storage means for storing data;
spindle motor means for rotating the rotatable storage means;
spindle motor control means for controlling the spindle motor means, where the spindle motor control means inductively senses spindown of the spindle motor means by
executing an inductive sensing cycle through all states, $S_1$ through $S_{total}$, of the spindle motor means to determine a minimum current rise time value, $T_{min1}$, occurring at a state, $S_{min1}$, of the spindle motor means, and
executing a further inductive sensing cycle through all states, $S_1$ through $S_{total}$, of the spindle motor means to determine a further minimum current rise time value, $T_{min2}$, occurring at a state $S_{min2}$ of the spindle motor means,
where the spindle motor control means executes a braking operation of the spindle motor means and re-executes the inductive sensing cycle and further inductive sensing cycle if $S_{min1}$ is different from $S_{min2}$.

6. The system of claim 5, where the rotatable storage means comprises a hard disk.

7. The system of claim 5, where the spindle motor control means compares a difference value to a threshold value to determine whether the spindle motor means has substantially ceased rotating before executing the braking operation, where the difference value corresponds to $T_{2min}-T_{1min}$.

8. The system of claim 5, where the spindle motor control means comprises:
motor drive means for providing PWM drive power to the spindle motor means;
current sense means for monitoring drive current provided to the spindle motor means by the motor drive means;
processing means for controlling operation of the motor drive means and to receive one or more signals from the current sense means indicative of a value of the drive current;
firmware means for directing the motor drive system to brake rotation of the spindle motor means in response to inductive sensing of the rotation of the spindle motor means, where the firmware means is executable by the processing means.

9. A process for operating a disk drive system comprising:
storing data on a rotatable storage medium;
rotating the rotatable storage medium with a spindle motor;
inductively sensing spindown of the spindle motor by
executing an inductive sensing cycle through all states, $S_1$ through $S_{total}$, of the spindle motor to determine a minimum current rise time value, $T_{min1}$, occurring at a state, $S_{min1}$, of the spindle motor, and
executing a further inductive sensing cycle through all states, $S_1$ through $S_{total}$, of the spindle motor to determine a further minimum current rise time value, $T_{min2}$, occurring at a state $S_{min2}$ of the spindle motor,
executing a braking operation of the spindle motor and re-executing the inductive sensing cycle and further inductive sensing cycle if $S_{min1}$ is different from $S_{min2}$.

10. The process of claim 9, where storing data comprises storing data on a hard disk.

11. The process of claim 9, further comprising comparing a difference value to a threshold value to determine whether the spindle motor has substantially ceased rotating before executing the braking operation, where the difference value corresponds to $T_{2min}-T_{1min}$.

* * * * *